July 4, 1967  R. P. SLICKER ET AL  3,329,751
MOLDING USING A MATERIAL YIELDING AN INERT ATMOSPHERE IN MOLD
Filed June 10, 1966
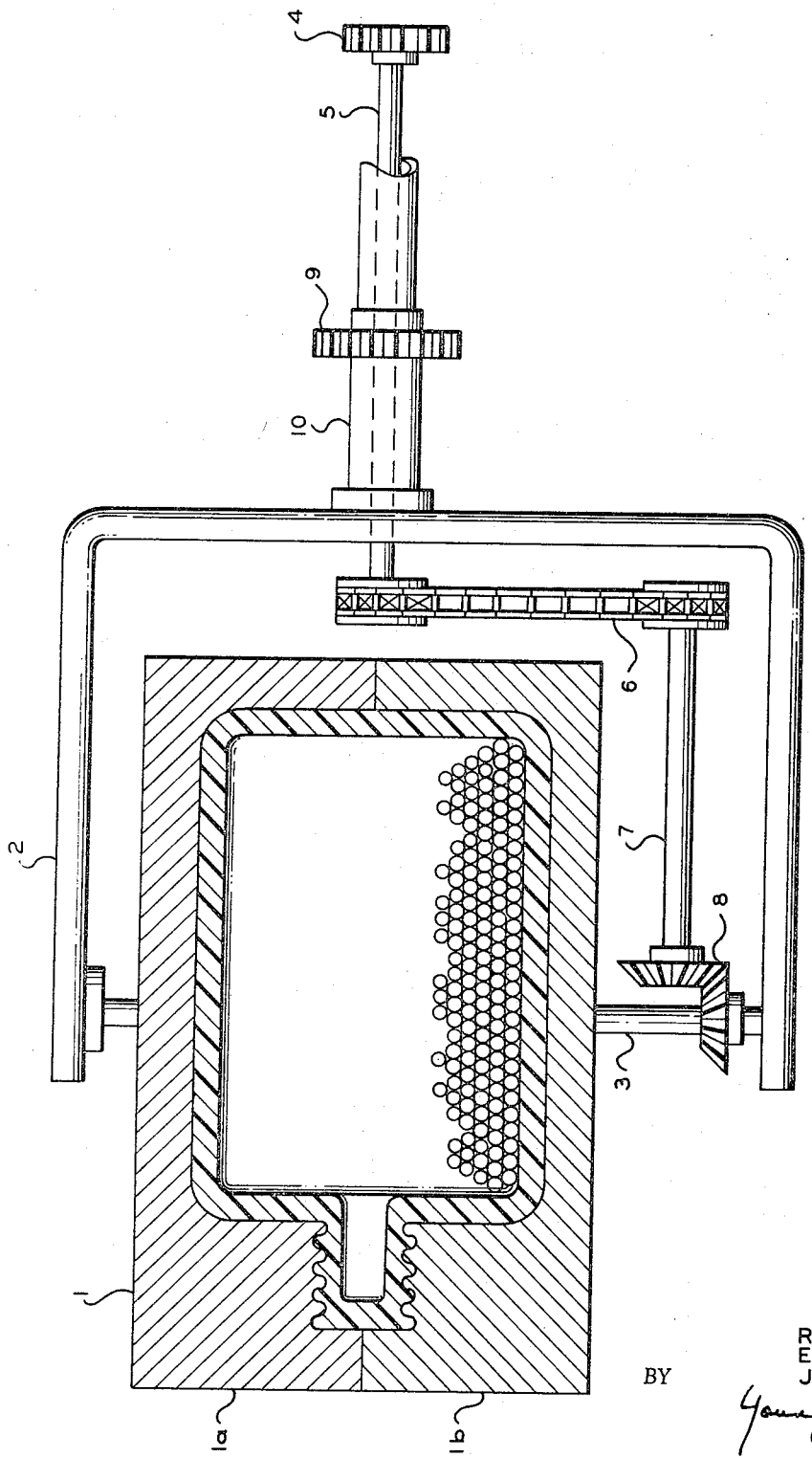
INVENTORS
R.P. SLICKER
E.C. HELD, JR.
J.L. RAKES
BY
ATTORNEYS

United States Patent Office 3,329,751
Patented July 4, 1967

3,329,751
MOLDING USING A MATERIAL YIELDING AN
INERT ATMOSPHERE IN MOLD
Robert P. Slicker and Edward C. Held, Jr., Bartlesville,
Okla., and James L. Rakes, East Providence, R.I., assignors to Phillips Petroleum Company, a corporation of Delaware
Filed June 10, 1966, Ser. No. 556,545
10 Claims. (Cl. 264—85)

The invention relates to molding of plastics.

In one of its concepts the invention is concerned with providing a material within a mold with the plastic as it is being molded which under the conditions of molding will decompose to yield an inert or protective atmosphere. In another of its concepts, the invention employs a solid material which yields an inert gas or vapor, e.g., a solidified gas in contact with the plastic as it is a liquid or being molded, the solid material or solidified gas yielding an inert or protective vapor or gas phase thus intimately protecting the plastic against degradation or oxidation. In still another of its concepts, the invention admixes intimately with a powdered plastic prior to its introduction into a mold, a liquid or a solid material or a subdivided solidified gas which is converted to the vapor or gas phase during the onset of the molding step. In a further concept of the invention, there is admixed solid, subdivided carbon dioxide with a powdered plastic, such as a particle form polyolefin, e.g., polyethylene, polypropylene, and the mixture thus formed is put into the mold and molded under conditions causing conversion of the solid carbon dioxide to the gas phase. In a still further concept the invention uses solid material such as ammonium carbonate to yield the protective or inert atmosphere in the mold. In one embodiment of the invention, the plastic and the material producing the protection of the plastic are placed into a rotating mold, the formed vapor or gas in the mold protecting the plastic, as noted herein, with considerable improvement in impact strength of the plastic, the odor and color of the molded product. In another concept still, the protective vapor or gas is formed in the mold by decomposition of a liquid which can be either fed to the mold separately or along with the plastic, in the latter case it can be wetting the plastic, e.g., wetted particle form plastic, e.g., dimethyl sulfone.

The invention is particularly adapted to rotational molding and will be described in connection with such an operation.

The presence of oxygen in the mold cavity together with plastic or resin undergoing molding can be deleterious to the quality of the finished product.

We have conceived that mixing chopped Dry Ice with the resin charge, as in rotational molding, results in the generation in the mold of an inert atmosphere which considerably retards oxidation of the resin. The Dry Ice or solidified gas preferably is finely subdivided, admixed with the powdered plastic and added to the mold along with the particle form plastic. A longer retention time in the oven before the melt index drop-off begins is thus made possible. Low temperature impact properties are greatly improved when molding a mixture according to the invention in a rotating mold. We have also conceived that the addition to the mold along with the plastic as when the plastic is being added to the mold a material which decomposes to yield a vapor or gas which protects the plastic against the oxygen or atmosphere in the mold which can adversely affect the plastic that deterioration of the properties of the plastic during molding is considerably reduced or eliminated. Only a relatively small quantity of material is added because on decomposition there will result a relatively large amount of the vapor or gas which will be protective in one manner or another as herein discussed. Thus, there can be added a liquid or solid which will decompose, for example, a sulfone, e.g., dimethyl sulfone or an acetone, e.g., β propiolacetone.

An object of this invention is to provide an improved method of molding a plastic or resin. A further object of the invention is to provide an improved rotating mold molding operation. A further object of the invention is to provide an inert or protective atmosphere during a molding operation in which a plastic or resin is molded. A still further object of the invention is to improve the impact strength of the plastic in the final product. A further object still is to provide a plastic charge for a molding operation which permits a longer retention time of the mold in the oven. A further object still is to provide a plastic charge which will spread around in a rotating mold. Yet another object of the invention is to provide an improved method for molding a polyolefin to protect it against drop-off of melt index and to improve impact strength of the molded product.

Other concepts, objects and the several advantages of this invention are apparent from a study of this disclosure and the appended claims.

According to the present invention, there is provided an improved operation for molding a plastic or resin which may be subject to deleterious action of air at molding heat which comprises adding to the mold in which the plastic or resin is to be molded a solid material or solidified gas, e.g., carbon dioxide to produce a protective atmosphere in the mold. In a now preferred embodiment of the invention, the solidified gas is carbon dioxide and the Dry Ice is finely subdivided, admixed with the resin powder and the mixture added to the mold just before the molding step.

The invention is applicable to the molding of various known plastics and resins to protect these against oxidation or degradation or otherwise against loss of desirable properties.

The invention is particularly adapted to the molding of solid polyolefins as are obtained by the process described in U.S. Patent 2,825,721 issued Mar. 4, 1958 to John Paul Hogan and Robert L. Banks.

The inert or protective atmosphere or vapor or gas according to the invention is one which will protect the plastic being molded against deterioration of its properties and said atmosphere can be protective by simply blanketing the plastic to prevent its contact with air or oxidizing gas or it can protect by sequestering said air or oxidizing gas so that it cannot act on the plastic.

The drawing diagrammatically illustrates an operation according to the invention wherein thermoplastic and carbon dioxide are introduced into the mold.

Example

In a rotational molding operation, there was molded a 3 quart bottle. The resin employed was a high density polyethylene as can be obtained by the process of the just-mentioned patent. Two hundred grams of the polyethylene powder known in the trade under the trademark Marlex were added to the mold along with a tablespoon of crushed solid $CO_2$. The $CO_2$ had been crushed into particles about the size of those of table salt and the polyethylene had been ground and screened through a 35 mesh screen. This polyethylene and the crushed $CO_2$ were added to the mold which was rotated at 5 r.p.m., minor axis, and 15 r.p.m., major axis. The mold was rotated in an oven maintained at 650° F., the mold remaining in the oven for 8 minutes, whereupon the mold was removed from the oven and quenched with a water spray. The mold was then opened and the bottle removed. There was a vent tube positioned in the opening which later is cut out of the neck of the bottle. This vent tube extended into near the center of the mold.

The specific Marlex polyolefin plastic employed is known in the trade as TR–951. It had a density, grams per cc. ASTM D1505–63T of .950, a melt index in grams/10 minutes ASTM D1238–62T of 7.0 and other related properties currently ascertainable from publication concerning this plastic.

The following table illustrates the advantageous results obtained by adding the Dry Ice, as above described.

ADDITION OF DRY ICE TO IMPROVE MOLDED PROPERTIES
[Base resin is TR–951]

| Molded results | TR–951 (No Dry Ice) | Powder TR–951 (With Dry Ice) tbsp. full in 3 qt. mold |
|---|---|---|
| Density | .9473 | .9319. |
| M.I. | 4.9 | 6.7. |
| Tensile (2″/min.) | 3,200 | 3,000. |
| Elongation (2″/min.) | 32 | 87. |
| Tensile Tear (2″/min.) | .47 | .48. |
| Impact, 0° F | 2.3 lb. Ball: | 8.0 lb. Ball:* |
|  | 2.3 ft.-lbs | >32.0 ft.-lbs. |
|  | 2.3 ft.-lbs | >32.0 ft.-lbs. |
|  | 2.3 ft.-lbs | >32.0 ft.-lbs. |
|  | 2.3 ft.-lbs | >32.0 ft.-lbs. |
|  |  | 24.0 broke at neck. |

*The most severe test available with equipment at hand. Note 8.0 lb. ball was used, instead of 2.3 lb. ball, to increase the severity of the test.

It will be understood that the Dry Ice is subliming to form a carbon dioxide gas blanket at all times when it is surrounded by an atmosphere, the temperature of which is above that of the Dry Ice. Accordingly, as the Dry Ice is charged to the mold, either along with the resin or in admixture therewith, there is being formed gas which serves to expel considerable air or oxygen from the mold before the mold is closed.

The invention involves the use of any liquid or solid that will give off an inert gas or protective atmosphere, vapor or gas at the temperature and pressure encountered in a rotational mold during the molding operation. The invention is effective when rotational molding any plastic that is degraded during the molding operation as a result of the temperature in the mold and the presence of atmospheric gases. Some of the plastics which may be used in this invention are polyvinyl acetate, polyvinyl chloride, styrene and nylon.

Ammonium carbonate, ammonium bicarbonate, ammonium formate, and ammonium bisulfite can be used as the solids that give off an inert or protective gas or vapor in the mold when plastics are being rotational molded that melt at a temperature high enough to decompose the ammonium carbonate. The ammonium carbonate can be used when polypropylene is being molded.

Any liquid which yields a protectively acting vapor or gas when it decomposes can be used. Such liquid will be selected to decompose at a temperature ensuing its decomposition at the working temperature of the mold.

Preferably, the material whether solid, liquid or other will decompose or vaporize very quickly.

When a liquid is used it can also be admixed with the plastic as when the plastic particles are wetted therewith, the amounts of liquid used can be adjusted or proportioned to not only protect the plastic, but to aid or lubricate its disposition in the mold.

When the materials other than Dry Ice of the example are used, similar improvement is obtainable.

Reasonable variation and modification are possible within the scope of the foregoing disclosure and the appended claims to the invention the essence of which is that, in a molding operation a material, preferably a subdivided, frozen gas or a liquid or solid which decomposes in the mold at the outset of molding the plastic or resin is added into a mold during a molding operation in which said plastic or resin is subject to degradation due to oxidation or presence of air during the molding step, in a more preferred embodiment of the invention the said material being admixed with the plastic and being added therewith to the mold.

We claim:
1. In a rotational molding method, the steps comprising:
   (a) providing in a mold both solid powdered thermoplastic and at least one piece of solid carbon dioxide;
   (b) rendering said thermoplastic material into a moldable state by heating the same;
   (c) substantially simultaneously converting said carbon dioxide particle from a solid to a gaseous state;
   (d) the solid carbon dioxide being placed into said mold in a manner and amount sufficient to form in said mold a protective atmosphere in said mold as it contains said solid powdered thermoplastic and as said thermoplastic is subjected to heat in said mold so as to protect said thermoplastic against degradation.

2. A method according to claim 1 wherein the solid powdered thermoplastic is placed into the mold and solid subdivided carbon dioxide is directly introduced into the mold just prior to the beginning of the heating step.

3. A molding method according to claim 1 wherein the powdered thermoplastic and solid subdivided carbon dioxide are admixed and then placed into the mold just prior to the molding step.

4. A method according to claim 1 wherein said thermoplastic is a polyolefin.

5. A method according to claim 1 wherein said thermoplastic is selected from polyethylene, polypropylene, polyvinyl acetate, polyvinyl chloride, styrene and nylon.

6. In a molding method, the steps comprising:
   (a) providing in a mold both solid powdered thermoplastic and at least one piece of solid carbon dioxide;
   (b) rendering said thermoplastic material into a moldable state by heating the same;
   (c) substantially simultaneously converting said carbon dioxide particle from a solid to a gaseous state;
   (d) the solid carbon dioxide being placed into said mold in a manner and amount sufficient to form in said mold a protective atmosphere in said mold as it contains said solid powdered thermoplastic and as said thermoplastic is subjected to heat in said mold so as to protect said thermoplastic against degradation, thereby producing an essentially non-vesicular molded product.

7. A method according to claim 6 wherein the solid powdered thermoplastic is placed into the mold and solid subdivided carbon dioxide is directly introduced into the mold just prior to the beginning of the heating step.

8. A molding method according to claim 6 wherein the powdered thermoplastic and solid subdivided carbon dioxide are admixed and then placed into the mold just prior to the molding step.

9. A method according to claim 6 wherein said thermoplastic is a polyolefin.

10. A method according to claim 6 wherein said thermoplastic is selected from polyethylene, polypropylene, polyvinyl acetate, polyvinyl chloride, styrene and nylon.

References Cited
UNITED STATES PATENTS

| | | | |
|---|---|---|---|
| 1,345,904 | 7/1920 | Wishart | 264—51 X |
| 2,889,291 | 6/1959 | Moore | 264—51 X |
| 3,250,730 | 5/1966 | Palmer | 264—51 X |
| 3,250,731 | 5/1966 | Buhl | 264—51 X |
| 3,253,066 | 5/1966 | Hardy | 264—51 |

ROBERT F. WHITE, *Primary Examiner.*

R. B. MOFFITT, *Assistant Examiner.*